No. 769,909. PATENTED SEPT. 13, 1904.
A. W. LIVINGSTON.
AUTOMATIC WEIGHING MACHINE.
APPLICATION FILED AUG. 17, 1903.
NO MODEL. 6 SHEETS—SHEET 1.

Witnesses:
F. C. Fliedner
J. H. Nurse

Inventor
Andrew W. Livingston
By Geo. H. Strong
atty.

No. 769,909. PATENTED SEPT. 13, 1904.
A. W. LIVINGSTON.
AUTOMATIC WEIGHING MACHINE.
APPLICATION FILED AUG. 17, 1903.
NO MODEL. 6 SHEETS—SHEET 2.

Witnesses:— Inventor:
F. C. Fliedner Andrew W. Livingston
By Geo. H. Strong.
Atty.

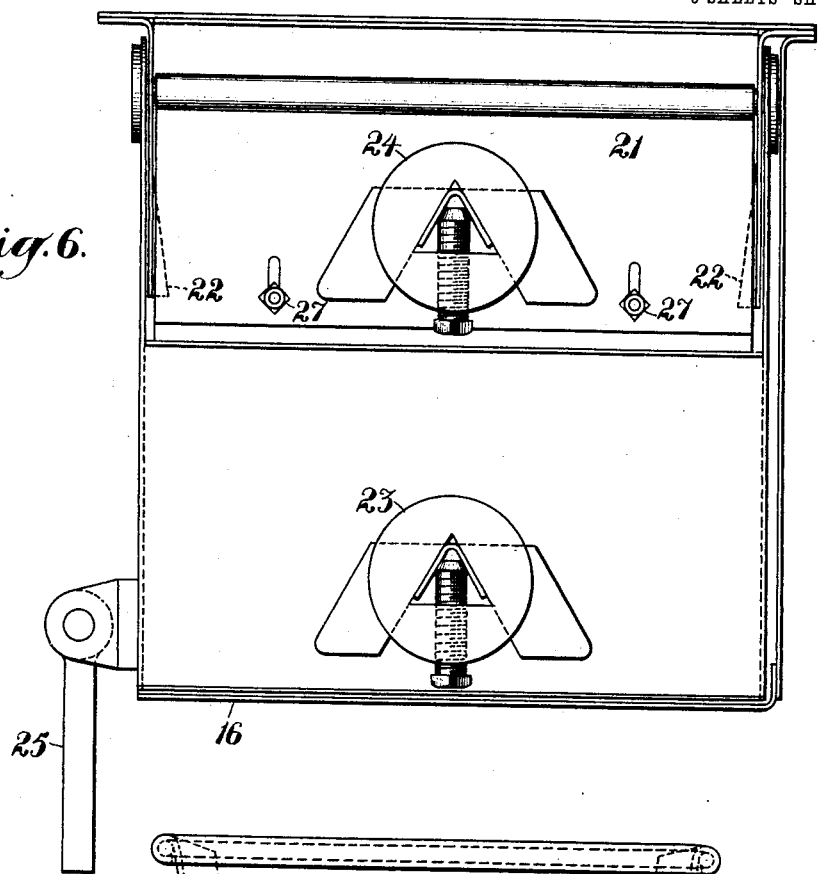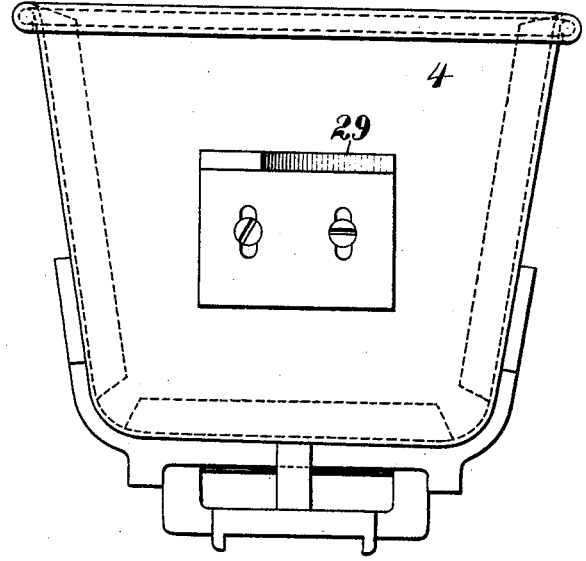

No. 769,909. PATENTED SEPT. 13, 1904.
A. W. LIVINGSTON.
AUTOMATIC WEIGHING MACHINE.
APPLICATION FILED AUG. 17, 1903.
NO MODEL. 6 SHEETS—SHEET 5.

Witnesses:-
F. C. Fliedner
J. H. Howse

Inventor,
Andrew W. Livingston
By Geo. H. Strong.
Atty.

No. 769,909. PATENTED SEPT. 13, 1904.
A. W. LIVINGSTON.
AUTOMATIC WEIGHING MACHINE.
APPLICATION FILED AUG. 17, 1903.
NO MODEL. 6 SHEETS—SHEET 6.

Witnesses:—
F. C. Fliedner
J. H. Towse

Inventor,
Andrew W. Livingston
By Geo. H. Strong
Atty

No. 769,909.

Patented September 13, 1904.

UNITED STATES PATENT OFFICE.

ANDREW W. LIVINGSTON, OF ALAMEDA, CALIFORNIA.

AUTOMATIC WEIGHING-MACHINE.

SPECIFICATION forming part of Letters Patent No. 769,909, dated September 13, 1904.

Application filed August 17, 1903. Serial No. 169,726. (No model.)

*To all whom it may concern:*

Be it known that I, ANDREW W. LIVINGSTON, a citizen of the United States, residing at Alameda, in the county of Alameda and State of California, have invented new and useful Improvements in Automatic Weighing-Machines, of which the following is a specification.

My invention relates to an improved apparatus for automatically segregating, weighing, and delivering dried fruits or other material in any predetermined quantity to be put up subsequently in packages of uniform size and weight. Its object is to provide a continuous-movement machine which shall be automatic, accurate, and of large capacity.

It consists of the parts and the construction and combination of parts, as hereinafter more fully described, having reference to the accompanying drawings, in which—

Figure 1:
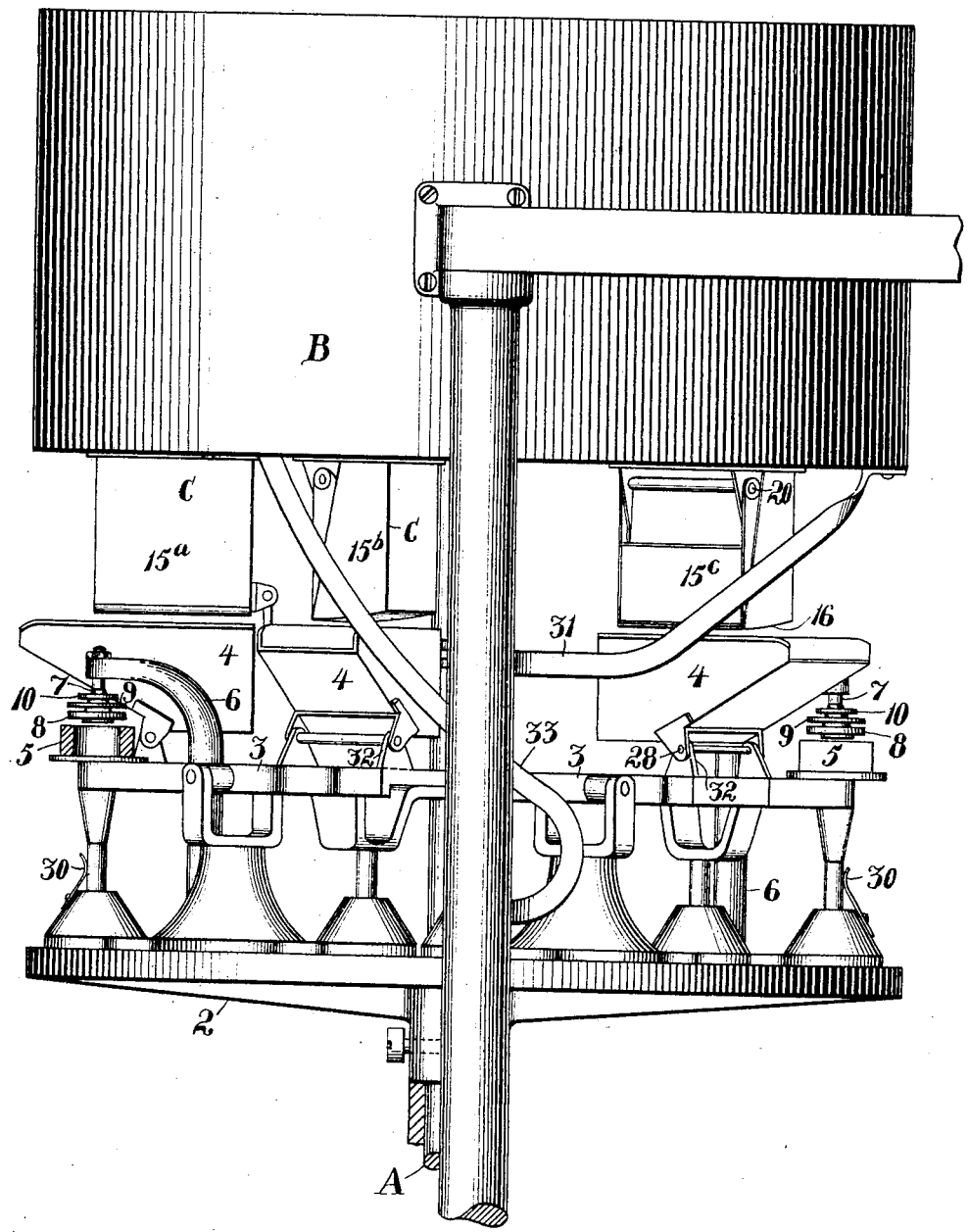
Figure 2:
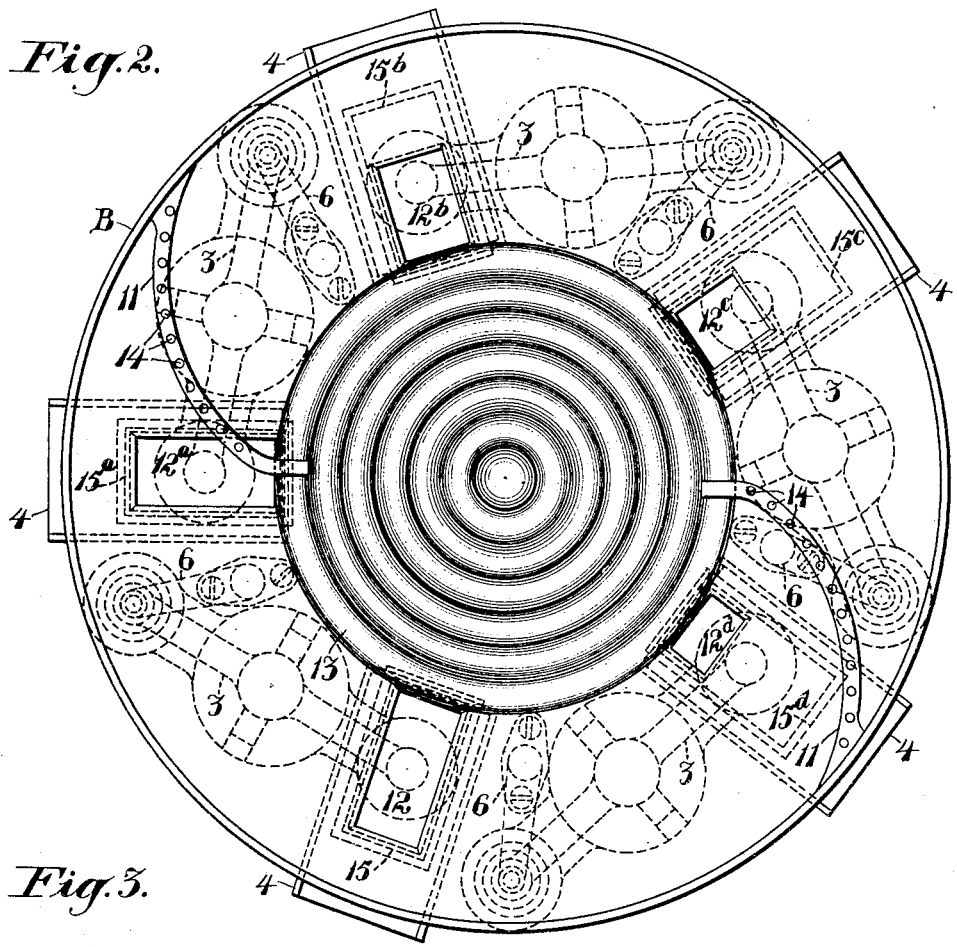
Figure 3:
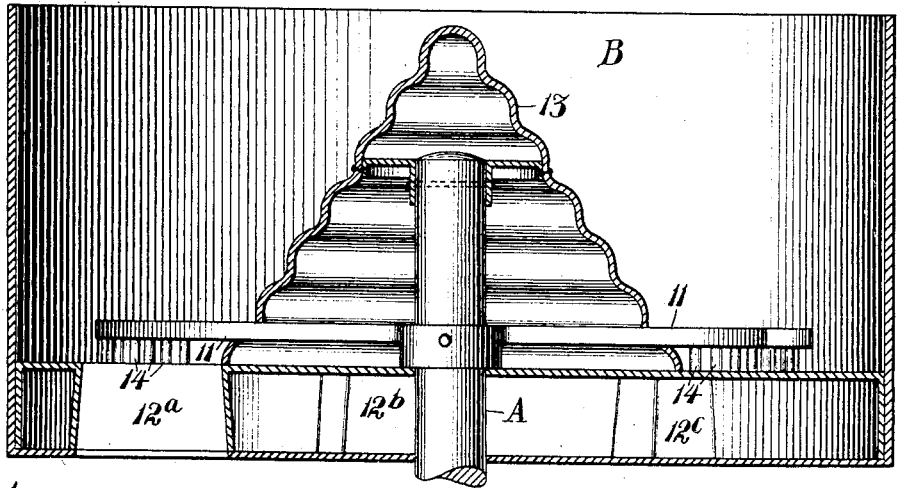
Figure 4:
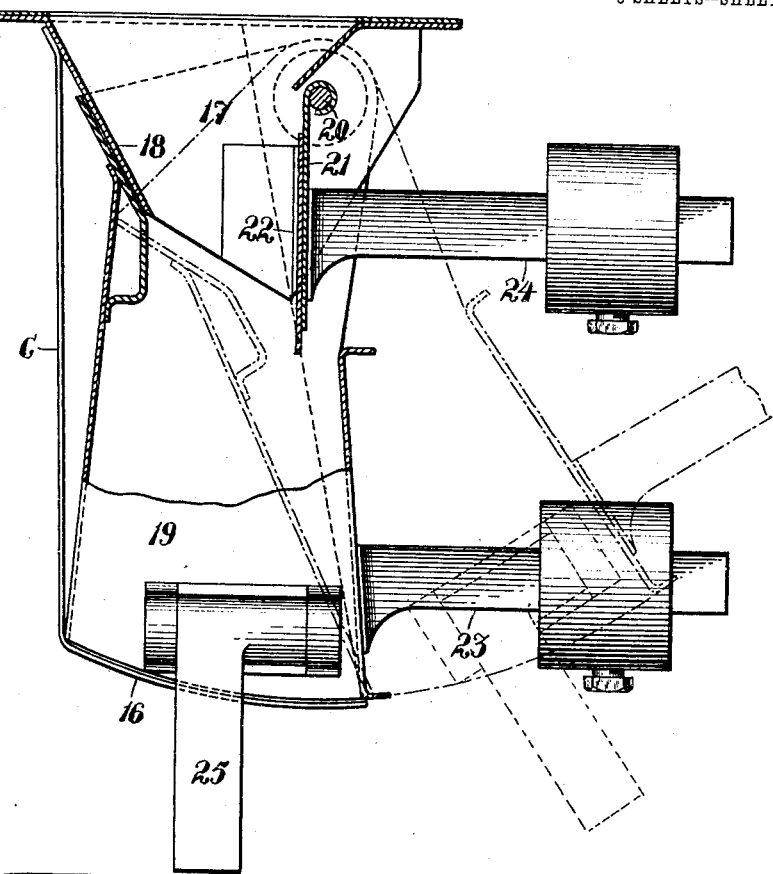
Figure 5:
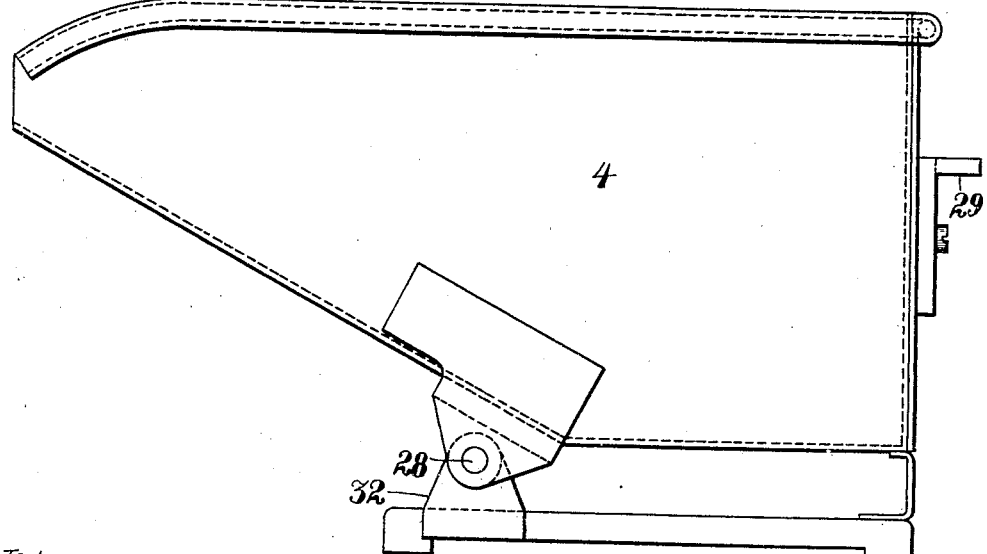
Figure 8:
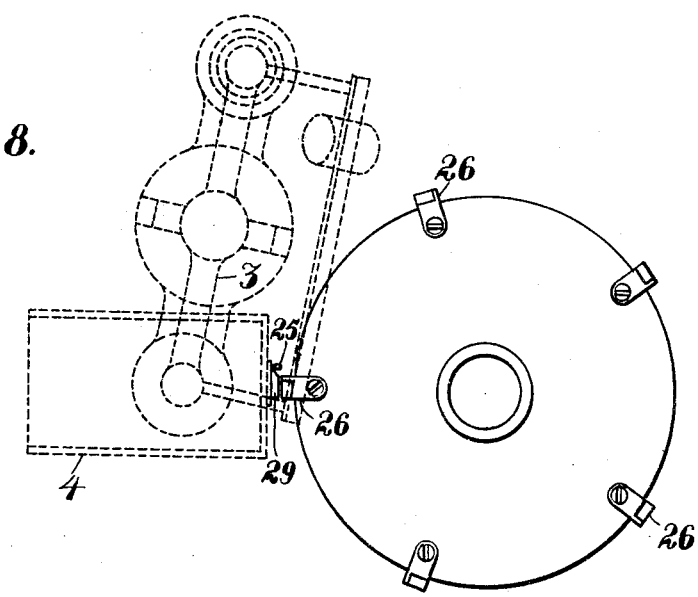
Figure 9:
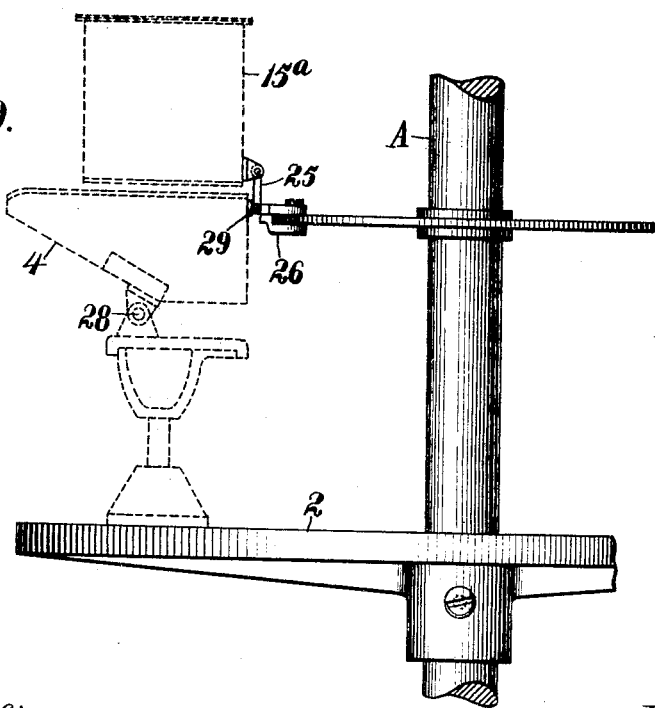
Figure 10:
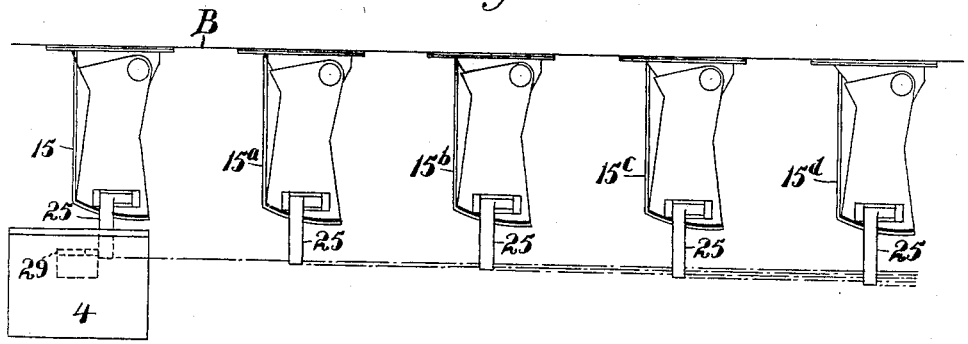
Figure 11:
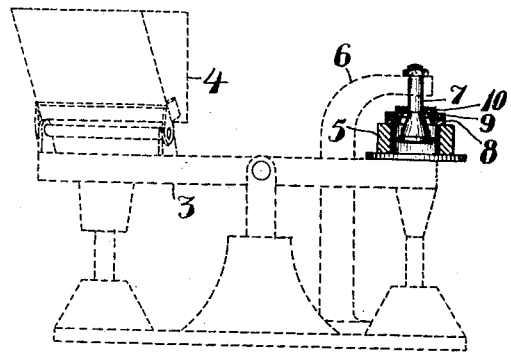

Figure 1 is an elevation of my apparatus. Fig. 2 is a plan view of same. Fig. 3 is a vertical section of the feed-hopper. Fig. 4 is a side view of a feeder, partly in section. Fig. 5 is a side view of a scoop. Fig. 6 is a rear view of the feeder shown in Fig. 4. Fig. 7 is a rear view of the scoop shown in Fig. 5. Fig. 8 is a plan view of the rotary disk carrying rotary stops and showing relation to scale mechanism. Fig. 9 is a side elevation showing position of rotary disk above platform. Fig. 10 is a linear projection of the feeders to show diagrammatically, as it were, the disposition of the ends of the fingers 25 and the scoop projection 29. Fig. 11 shows the scale-beam at balance.

A represents a central vertical shaft, driven by any suitable means, and 2 a platform carrying the weighing mechanism and secured to and revoluble with the shaft. In the present instance I have shown the weighing mechanism as comprising five scales located at suitable intervals around the shaft, each having a balance-beam 3 with a tilting scoop or hopper 4 at its outer end and a counterbalance-weight 5 at its opposite end. The weight 5 is fixed upon the beam and partakes of its movement and is adapted to weigh a trifle less than the actual amount of material intended for each package. For example, if 50 packages are to weigh one pound the weight 5 would balance with the scoop, say, at fourteen and one-fourth ounces. The difference between that amount and the desired sixteen ounces is made up through the medium of mechanism forming the essential features of my invention.

Disposed in suitable relation to the weight end of each scale is a standard 6, fixed rigid to and movable with platform 2 and having a pendent cone portion 7 immediately above weight 5. The latter is recessed to admit the cone when the beam is elevated. The cone supports three washers 8 9 10. The washer 8 represents one ounce, washer 9 represents one-half an ounce, and washer 10 represents one-fourth ounce, each separated slightly from the others, but all adapted to be lifted in succession by the rising weight 5, so that when the scale-beam is at perfect balance the three washers will be lifted free of its normal cone support and be sustained on weight 5. The combined weight of the oscillating weight 5 and the three washers thus exactly counterbalances sixteen ounces of material in the scoop. The manner in which the fruit or other material is delivered into the scoop coöperatively with this weight-registering device and the means for regulating the delivery are as follows: B is a stationary feed-hopper suitably supported above the scales and concentric with the shaft A, which extends up through the hopper and carries the agitating-arms 11. The hopper is made with a double bottom, having the vertically-disposed chutes or discharge-passages 12 $12^a$ $12^b$ $12^c$ $12^d$ arranged in a circle about shaft A and above the path of travel of scoops 4. The first two chutes 12 and $12^a$ are here shown as approximately of the same size, while chutes $12^b$, $12^c$, and $12^d$ successively decrease in diameter. The several chutes are slightly smaller at their top than at their lower or discharge end. By thus having the inlet-orifice reduced relative to the rest of the passage the chance of the sticky mass of fruit—such, for example, as prepared prunes—packing in the chute and adhering to the sides is avoided. The fruit is delivered at the top of the hopper by any suitable means upon a central conical corrugated spreader 13, fixed to and turnable like blades 11 with shaft A. Arms 11 are an inch or so above the bottom of the hopper and have downwardly-projecting pins 14, aiding, in conjunction with the corrugations of the conical spreader, further to disengage the fruit mass and separate it into its individual components. The arms are curved forward at their outer ends, as shown, and coöperate with the walls of the hopper to feed the fruit lying in the annular space between the walls and spreader in toward the openings in chutes 12 12$^a$, &c. Fixed to the under side of the hopper B are the respective scale-feeders 15 15$^a$ 15$^b$ 15$^c$ 15$^d$, into which the respective chutes 12 12$^a$, &c., empty. As clearly shown in Fig. 4, each of these feeders comprises a rectangular-shaped casing C, open at the top and back and on the side adjacent to shaft A and having a concaved and inclined bottom 16. This casing has a short rigid throat portion 17 in its upper part, open at the rear and with a front inclined wall 18. A box 19, open at each end, is pivoted at 20, and the lower edges of the walls are movable over the concaved bottom 16, which latter normally forms the bottom of the box. A plate 21 is pivoted concentric with box 19 at 20 and hangs normally in vertical position in contact with the slotted rear wall of box 19. The forward movement of plate 21 is limited by suitable stops, as the inturned flange 22 on the throat 17. Box 19 carries a weight projection 23, whereby it is normally swung under the throat 17, so that it stands substantially vertical, and fruit from a relative chute, as 12, above will drop into the box and rest therein upon bottom 16 and against the hinged back plate 21, which is also counterweighted, as at 24, until the box is swung back on its hinge 20 to scrape the fruit from the stationary bottom 16 and deposit it in a scoop 4. The manner in which this automatic and periodic discharge is effected will be described later.

Each feeder is constructed to hold a certain amount, by weight, of dried fruit or other material handled.

While this apparatus is primarily devised for the handling and weighing of dried fruits, as prunes, it will be obvious that it may be readily adapted to handle any other material in bulk.

By preliminary experiment it may be determined just what amount, by weight, each one of the feeders 15 15$^a$ 15$^b$ will contain of the particular run of fruit. As prunes, for example, are graded, according to their size, into thirty to forties, forty to fifties, fifty to sixties, &c.—i. e., the average number of prunes per pound—the fruit of any one run will be of practically uniform size and weight. Hence where one-pound packages are to be put up feeders 15 and 15$^a$ will each hold a trifle less than half a pound, since the difference will be made up from the contents of one or more of the succeeding feeders 15$^b$, 15$^c$, or 15$^d$.

It is preferable for obvious reasons that the feeders 15 15$^a$ should deliver together a little less than a pound rather than more. Of course one feeder could be made to deliver the major quantity and the shortage made up from the others; but I have preferred for purposes of gain in space and in speed of operation, accuracy, and for other practical reasons to have feeders 15 and 15$^a$ divide the amount about as here shown. Hinged plate 21, or valve, as, in fact, it is, governs the amount discharged from a feeder. The plate does not extend the length of box 19, and while it is pivoted to the same pivot 20 with the box it has a movement independent of the latter. When the box is swung back in discharge position by the engagement of the hinged projection 25 with a rotary stop, as 26, the valve-plate 21 maintains its normal pendent vertical position by means of the counterweighted arm 24, operating in the opening in the rear wall of box 19 until the front wall of the box engages valve-plate 21 to cut off the fruit-supply. Only that amount of fruit below the sweep of plate 21 will be discharged by the feeder. At the same time the manner of suspending the plate will not permit of the jamming or bruising of any of the fruit, because the plate when met by the front wall of the box or the intervening fruit column will turn on its hinge 20 in unison with the box, the pressure of weight 24 being sufficient to prevent any more prunes passing below until the box and valve once more assume their normal vertical position. In practice while the end of the plate will seldom come in actual contact with the front wall of the box portion the uniformity in size of the fruit and the contracted form of the throat assure no further feed below plate 21 when the prune column is engaged between the front wall of the box and the plate, still, as just said, the hinging of the valve-plate allows the valve to give at the right moment without letting up in its pressure.

Valve-plate 21 is made in two sections extendible by means of the set-screws 27, whereby the deliverable quantity of any one feeder may be varied, it being understood that the amount delivered from a feeder is that amount lying upon the stationary bottom 16 and below the path described by the lower end of valve-plate 21 when box 19 is turned on its hinge.

Assuming quantities of one pound each are to be weighed and discharged from the machine, feeders 15 and 15$^a$ will be adapted to deliver into a scoop approximately seven and a-half ounces each. The succeeding feeder 15$^b$ will deliver one ounce, or, say, three prunes, feeder 15$^c$ a fraction less, or, say, two prunes, and feeder 15$^d$ one prune, the idea being that the deficiency in weight of the first two feeders will be made up from either or any two or all of the succeeding feeders. This discharge and selection are effected as follows: Scoops 4 are pivoted on the scale-beam, as shown at 28, so as to have an oscillating movement radially of platform 2 and adapted to discharge over the rim of the latter. The inner ends of the scoops carry horizontal cam-guides 29, which are all in the same horizontal plane only when all of the scales are simultaneously in perfect balance. When any one scale is in that position, its cam-guide 29 will pass freely beneath the pendent hinged projection 25 on each of the feed-boxes of feeders $15^b$, $15^c$, and $15^d$; but when any scale is at less than balance—that is, when a scoop 4 does not contain enough to bring it down to balance—its cam 29 will engage one or the other of the hinged projections just mentioned (the lower ends of which are in different horizontal planes) to throw the projection toward the center of platform 2 and cause it to come into contact with a rotary stop 26, disposed relative to each cam 29. The projection 25 is carried on a short distance by the continued movement of 26, turning box 19 on its hinge and causing discharge into the scoop beneath, as previously described.

As each projection 25 on the successively-arranged feeders $15^b$, $15^c$, and $15^d$ has its end in a different horizontal plane, they will be engaged at correspondingly-different elevations of the scoop. Each scoop as it comes beneath the main feeders 15 and $15^a$ is adapted to engage its projection 25 and receive its contents. This may or may not bring the receiving-scoop to balance. If it is brought to balance, the weights 8 9 10 will all rest on weight 5 on the scale-beam, as in Fig. 11. The balanced scoop will then ride free beneath feeders $15^b$ $15^c$, and $15^d$; but if after receiving the contents from feeders 15 and $15^a$ the scoop is still short weight, say, one ounce it trips the largest of the smaller feeders, or feeder $15^b$. If still short weight an amount in excess of the contents of feeder $15^d$, it will trip feeder $15^c$. If still short, it will finally trip feeder $15^d$.

The weight of the contents of the several feeders may be so regulated that there will be no question of the contents of all the feeders making up the desired weight. If the short weight after tripping feeder $15^a$ is only one prune, the level of the scoop is such that it misses the intermediate projections on feeders $15^b$ and $15^c$ and only trips the last and smallest feeder $15^d$, and so with any other fraction of the total capable of being made up by any one feeder.

As the scale-beam must respond instantly to the receipts from the various feeders and as the scoop must come almost immediately to a position of rest and not oscillate back and forth, since it would disarrange the weights and interfere with the regularity and exactness of discharge from the feeders, I provide a light spring-brake, as 30, which bears lightly against the end of the scale-beam. The frictional contact of this spring with the beam is so slight that while it will cause the beam to stop without a return oscillation it will always allow the beam to go just the right distance and then stop. In other words, the pressure exerted by the spring is such that the beam would oscillate on the addition or substraction, say, of one pennyweight in the scoop; but it exerts its pressure in such a direction that the sensitive bobbing up and down of the scoop when near balance is obviated.

The operation of the machine is continuous. At each revolution a scoop discharges a predetermined quantity. The timing of the shaft is so regulated that each feeder has a chance to fill after being discharged and before the next succeeding scoop comes along. A scoop will receive the contents of feeders 15 and $15^a$, and any shortage in weight will be made up, as before described. The properly-filled scoop discharges into the packaging-machine or other receiver and is righted again during the traverse of the space between the last feeder $15^d$ and first feeder 15. This discharge is here shown as effected by the engagement of the upper edge of the point of the scoop with a fixed guide 31. The forward tilt of the scoop is limited by a stop 32. The scoop is righted by engaging a reverse guide 33. Thus each scoop is filled, dumped, and righted as the platform 2 revolves. The fruit coming into the stationary hopper B passes down through chutes 12 $12^a$, &c., to their respective feeders, which are constantly being filled, opened, closed, and refilled during the operation of the machine by the engagement of the cam-guides 29 and the longer or shorter hinged projections 25 and the consequent engagement of the latter with the rotary stops 26.

Having thus described my invention, what I claim, and desire to secure by Letters Patent, is—

1. In a continuously-operating automatic weighing-machine, the combination of a rotatable support, a series of scales thereon each having a scoop tiltable radially of the support, means for delivering predetermined quantities of material to said scoops, means for tilting said scoops, and means for rotating said support continuously.

2. In an automatic weighing-machine, the combination of a rotatable support, a series of scale-beams pivoted thereon and provided with scoops tiltable radially of the support, feed mechanism relative to the support, and means operatable by the scoops automatically controlling the supply from said feed mechanism.

3. In an automatic weighing-machine, the combination of a rotatable support, a series of scale-beams pivoted thereon, and provided with scoops tiltable radially of the support, feed mechanism, stop means rotatable with the support, and means carried by the feed mechanism engageable by the scoop and said stop means to operate said feed mechanism.

4. In an automatic weighing-machine, the combination of a continuously-operating traveling carrier, scales thereon, and a series of feeders in the path of said scales and operatable thereby, said feeders adapted to deliver each a definite measured quantity.

5. In an automatic weighing-machine, the combination of a traveling carrier, scales carried thereby, a series of fixed feeders each adapted to contain a definite measured quantity less than a desired total, and means operatable by the scales for discharging said feeders.

6. In an automatic weighing-machine, the combination of a traveling carrier, tilting scale-beams thereon, scoops on said beams, a series of fixed graduated feeders relative to the path of travel of said scoops, and means operatable in the travel of the carrier to effect discharge of one or more of said feeders into said scoops.

7. In an automatic weighing-machine, the combination of a traveling carrier, weighing mechanism thereon, and a series of successively-arranged valved feeders holding each a definite quantity less than a desired total, and means interposable in the path of the weighing mechanism whereby the valves of said feeders are operated to discharge the contents of the feeders.

8. In an automatic weighing-machine, the combination of a traveling carrier, weighing mechanism thereon, valved feeders and means pendent in the path of the mechanism to operate the valves and discharge the contents of the feeders.

9. In an automatic weighing-machine, the combination of a traveling carrier weighing mechanism thereon, valved feeders arranged successively and each adapted to contain a different and predetermined quantity, and selective mechanism operatable by the movements of the carrier to discharge any one of said feeders.

10. In an automatic weighing-machine, the combination of a traveling carrier, weighing mechanism thereon, and a series of successively-arranged feeders relative to said mechanism, said feeders arranged to discharge varying and predetermined quantities, and means interposable in the path of the carrier to discharge said feeders.

11. In an automatic weighing-machine, the combination of a traveling carrier, weighing mechanism thereon, and a series of successively-arranged feeders holding each a predetermined quantity of material and means operatable by the weighing mechanism to discharge automatically one or more of said feeders.

12. In an automatic weighing-machine, the combination of a traveling carrier, weighing mechanism thereon, a series of successively-arranged valved feeders and means interposable in different planes in the path of the carrier to discharge said feeders.

13. In an automatic weighing-machine, the combination of a traveling carrier, weighing mechanism thereon, a series of successively-arranged valved feeders and means in different horizontal planes interposable in the path of the carrier to discharge said feeders.

14. In an automatic weighing-machine, the combination of a traveling carrier, weighing mechanism thereon, feed mechanism relative to the path of travel of the weighing mechanism, said feed mechanism including a hinged open-ended container and a stationary bottom, means for retaining said container in normally closed bottom position, and means for turning said container on its hinges out of engagement with said bottom.

15. In an automatic weighing-machine, the combination of a traveling carrier, weighing mechanism thereon, feed mechanism relative to said carrier, said feed mechanism including a stationary hopper having a plurality of discharge-outlets in its bottom, means associated with said outlets for delivering a definite measured quantity, each of said outlets arranged to discharge a predetermined fraction of a desired total, closures controlling the discharge from said last-named means, and means operated by the traveling weighing mechanism to control automatically said closures.

16. In an automatic weighing-machine, the combination of a traveling carrier, weighing mechanism thereon, feed mechanism relative to the carrier, said feed mechanism including a hopper having a discharge-outlet in its bottom, a measuring device located beneath each outlet and a valved closure for said measuring device, and means on the carrier for operating said closure.

17. In an automatic weighing-machine, the combination of a traveling carrier, weighing mechanism thereon, feed mechanism relative to the carrier, said feed mechanism including a stationary hopper having a discharge outlet-passage in the bottom, a measure beneath said outlet, said measure contracted at its upper end, and a valved closure regulating the discharge from said outlet-passage operatable by the moving weighing mechanism.

18. In an automatic weighing-machine, the combination of a traveling carrier, weighing mechanism thereon, feed mechanism relative to the carrier, said feed mechanism comprising a stationary hopper having an annular series of discharge-passages in its bottom, a rotatable conical spreader concentric with and inclined within said annular series, arms rotatable with the spreader and coöperating with the walls of the hopper to deliver material to said discharge-passages, and valved devices for regulating the discharge from the latter.

19. In an automatic weighing-machine, the combination of a traveling carrier, weighing mechanism thereon, feed mechanism relative to the carrier, said feed mechanism including a hopper having an annular series of successively-arranged discharge-passages of different sizes, valved devices in the path of discharge from said passages, said devices each discharging a predetermined quantity and means operable by the traveling weighing mechanism to operate said devices.

20. In an automatic weighing-machine, the combination of a traveling carrier weighing mechanism thereon, feed mechanism including a movable container having inlet and outlet passages, a stationary part normally closing said outlet-passage, and a means in the path of the weighing-machine to move the container and effect discharge.

21. In an automatic weighing-machine, the combination of a traveling carrier weighing mechanism thereon, feed mechanism including a movable container having inlet and outlet passages, a stationary part normally closing said outlet-passage and a hinged part engageable by the weighing mechanism to move the container out of engagement with said stationary part.

22. An automatic feeder comprising a casing open at one side and back and having a concaved bottom, an open-ended container hinged in said casing concentric with said bottom and a hinged valve-plate coöperating with said bottom and the container to regulate the deliverable quantity of the feeder.

23. An automatic feeder comprising a casing open at one side and back, an open-ended container hinged in said casing, and a valve-plate hinged concentric with the container and coöperating with the bottom of the casing and front of the container to regulate the deliverable contents of the feeder.

24. An automatic feeder comprising a stationary casing open at one side and back, an open-ended container hinged at its upper rear edge in said casing, means for retracting the container normally within the casing, a valve-plate coöperating with the bottom of the casing and the walls of the container to regulate the discharge of the feeder.

25. An automatic feeder comprising a stationary casing open at one side and back, an open-ended container hinged at its upper rear edge in said casing and normally retracted therewithin, a resiliently-supported valve-plate in said container, and said valve and container having a limited movement independent of each other and each coöperating with the bottom of the casing to deliver the contents of the feeder.

26. In an automatic weighing-machine, the combination of a traveling carrier, scales thereon, a superposed feed-hopper, intermediate valve feed-delivery means, and means for operating said valve delivery means to discharge a predetermined quantity of material to the scales.

27. In an automatic weighing-machine, the combination of a traveling carrier, a tilting scale-beam thereon, a scoop or like containing means carried by said scale-beam, counterbalance-weight mechanism operatable by the movements of the scoop, and means for delivering successive and definite, measured increments of material into the scoop.

28. In a weighing-machine the combination with a rotatable support, of a tilting scale-beam carried thereon, a scoop tiltable radially of the support on one end of said beam, and a series of counterbalance-weights in different planes in the path of the opposite end of the beam.

29. In a weighing-machine, an oscillating scale-beam, and a friction-shoe 30 limiting the oscillation of said beam.

30. In an automatic weighing-machine, the combination with a rotatable support, of a series of separate independent scales arranged to deliver a definite measured quantity thereon, a series of independent successive feed mechanisms each adapted to contain a predetermined fraction of a desired total, and means for operating said feed mechanisms to discharge into said scales successively.

31. In an automatic weighing-machine, the combination with a continuously-moving series of weighing mechanisms each having a receiving vessel, of a fixed hopper having a series of independent outlets into communication with which said vessels are carried by the movement of said weighing mechanisms, each outlet of the series having a normally closed delivery device, measures relative to said outlets, and means controlled by the movement of said weighing mechanisms for automatically opening each of said devices in succession during the passage of each of said vessels to cumulatively load the same.

32. In an automatic weighing-machine, the combination of a traveling series of weighing mechanisms each having a receiving vessel, a fixed hopper having a plurality of independent outlets beneath which said vessels are carried by the movement of said weighing mechanisms, a plurality of closures arranged to normally close said outlets, each of said delivery devices in the series adapted to deliver a definite measured quantity, and means movable with said moving vessels whereby each of said closures may be automatically opened in succession during the passage of each of said vessels beneath it.

33. In an automatic weighing-machine, the combination with a continuously-moving series of weighing mechanisms each having a receiving vessel, of a hopper having a plurality of independent outlets each provided with a normally closed delivery device, a measure relative to each of said outlets and closures for said measures, and beneath which said vessels are carried by the movement of said weighing mechanisms, and means whereby each of said delivery devices may be automatically opened in succession during the passage of each of said vessels beneath it.

34. In an automatic weighing-machine, the combination of a traveling series of weighing mechanisms each having a receiving vessel, loading means for said vessels having a series of outlets each provided with a normally closed delivery device, said devices having definite discharge capacities, and means for opening the same in succession to thereby cumulatively load each of said vessels.

35. In an automatic weighing-machine, the combination with a traveling carrier, of a series of weighing mechanisms mounted thereon and each having a receiving vessel, a series of feeders for said vessels arranged along the path of movement thereof and having graduated and varying delivery capacities, and means operable in the travel of the carrier to effect a discharge from one or more of said feeders.

In testimony whereof I have hereunto set my hand in presence of two subscribing witnesses.

ANDREW W. LIVINGSTON.

Witnesses:
S. H. NOURSE,
JESSIE C. BRODIE.